United States Patent
Miles et al.

(10) Patent No.: US 10,859,997 B1
(45) Date of Patent: Dec. 8, 2020

(54) NUMERICALLY CONTROLLED MACHINING

(71) Applicant: Omax Corporation, Kent, WA (US)

(72) Inventors: Peter J. Miles, Kent, WA (US); Axel H. Henning, Black Diamond, WA (US)

(73) Assignee: OMAX Corporation, Kent, WA (US)

( * ) Notice: Subject to any disclaimer, the term of this patent is extended or adjusted under 35 U.S.C. 154(b) by 51 days.

(21) Appl. No.: 16/206,985

(22) Filed: Nov. 30, 2018

Related U.S. Application Data

(60) Provisional application No. 62/594,487, filed on Dec. 4, 2017.

(51) Int. Cl.
*G05B 19/401* (2006.01)

(52) U.S. Cl.
CPC .. *G05B 19/401* (2013.01); *G05B 2219/45036* (2013.01); *G05B 2219/50139* (2013.01)

(58) Field of Classification Search
CPC ........ G05B 19/401; G05B 2219/50139; G05B 2219/45056
USPC ................................................. 700/254, 251
See application file for complete search history.

(56) References Cited

U.S. PATENT DOCUMENTS

| | | |
|---|---|---|
| 3,449,742 A | 6/1969 | Stapleton |
| 3,668,498 A | 6/1972 | Austin, Jr. |
| 3,725,651 A | 4/1973 | Cutler |
| 3,870,941 A | 3/1975 | Ikenga et al. |
| 4,031,369 A | 6/1977 | Heaman et al. |
| 4,050,001 A | 9/1977 | Kishi et al. |
| 4,066,944 A | 1/1978 | Leenhouts |
| 4,084,083 A | 4/1978 | McNally et al. |
| 4,214,192 A | 7/1980 | Bromer et al. |
| 4,216,415 A | 8/1980 | Shimonou et al. |
| 4,404,507 A | 9/1983 | Dean et al. |
| 4,435,902 A | 3/1984 | Mercer et al. |
| 4,456,863 A | 6/1984 | Matusek |
| 4,555,758 A | 11/1985 | Inaba et al. |
| 4,578,748 A | 3/1986 | Abe et al. |
| 4,598,380 A | 7/1986 | Holmes et al. |
| 4,600,985 A | 7/1986 | Nozawa et al. |
| 4,626,756 A | 12/1986 | Inaba et al. |
| 4,644,460 A | 2/1987 | Kishi et al. |
| 4,728,872 A | 3/1988 | Kishi et al. |
| 4,761,595 A | 8/1988 | Goor |
| 4,787,049 A | 11/1988 | Hirata et al. |

(Continued)

FOREIGN PATENT DOCUMENTS

| | | |
|---|---|---|
| EP | 2584419 A2 | 4/2013 |
| FR | 2659264 A1 | 3/1990 |
| WO | 03089999 A1 | 10/2003 |

OTHER PUBLICATIONS

Hashish, M., "Visualization of the Abrasive-Waterjet Cutting Process," from Experimental Mechanics Jun. 1988.

(Continued)

*Primary Examiner* — Thomas C Lee
*Assistant Examiner* — Brendan A McGrath
(74) *Attorney, Agent, or Firm* — Perkins Coie LLP

(57) ABSTRACT

A geometric model fitting based calibration process determines offsets between the actual tool center point and theoretical tool center point of a numerically controlled machining system, thereby enabling the system to apply compensation to the offsets in order to align the actual and theoretical tool positions.

20 Claims, 5 Drawing Sheets

(56) References Cited

U.S. PATENT DOCUMENTS

| | | |
|---|---|---|
| 4,810,945 A | 3/1989 | Yoneda et al. |
| 4,822,218 A | 4/1989 | Satoh |
| 4,879,663 A | 11/1989 | Fuehrer |
| 4,903,213 A | 2/1990 | Buhler et al. |
| 4,912,385 A | 3/1990 | Kawamura et al. |
| 4,987,356 A | 1/1991 | Yamada et al. |
| 5,084,791 A | 1/1992 | Thanos et al. |
| 5,126,645 A | 6/1992 | Yoshimi et al. |
| 5,144,211 A | 9/1992 | Daggett et al. |
| 5,177,421 A | 1/1993 | Sasaki et al. |
| 5,212,430 A | 5/1993 | Jartyn |
| 5,249,161 A | 9/1993 | Jones et al. |
| 5,315,222 A | 5/1994 | Kasagami et al. |
| 5,331,264 A | 7/1994 | Cheng et al. |
| 5,508,596 A | 4/1996 | Olsen |
| 5,831,403 A | 11/1998 | Kanki et al. |
| 5,854,744 A | 12/1998 | Zeng et al. |
| 5,892,345 A | 4/1999 | Olsen |
| 5,986,425 A | 11/1999 | Onishi et al. |
| 6,120,351 A | 9/2000 | Zeng |
| 6,121,744 A | 9/2000 | Hoda et al. |
| 6,155,245 A | 12/2000 | Zanzuri |
| 6,227,087 B1 | 5/2001 | Thorsen et al. |
| 6,243,625 B1 | 6/2001 | Wyatt et al. |
| 6,616,372 B2 | 9/2003 | Seroka et al. |
| 6,705,921 B1 | 3/2004 | Shepherd |
| 6,766,216 B2* | 7/2004 | Erichsen ............... G06F 19/00 700/160 |
| 6,819,974 B1* | 11/2004 | Coleman ............... G06F 19/00 700/195 |
| 6,870,346 B2 | 3/2005 | Davidov |
| 6,879,415 B2 | 4/2005 | Kurosawa |
| 6,922,605 B1 | 7/2005 | Olsen |
| 7,035,708 B1 | 4/2006 | Olsen |
| 7,386,262 B2 | 6/2008 | Okamura et al. |
| 7,560,892 B2 | 7/2009 | Shibasaki et al. |
| 7,917,017 B2 | 3/2011 | Kanamori |
| 8,024,068 B2* | 9/2011 | Gray ..................... G05B 19/18 700/252 |
| 8,401,692 B2* | 3/2013 | Knaupp ................. G06F 19/00 700/193 |
| 8,423,172 B2 | 4/2013 | Erichsen et al. |
| 8,593,086 B2 | 11/2013 | Hay et al. |
| 8,676,372 B1 | 3/2014 | Bolin et al. |
| 9,573,289 B2 | 2/2017 | Hashish et al. |
| 9,658,613 B2 | 5/2017 | Henning et al. |
| 9,720,399 B2 | 8/2017 | Henning et al. |
| 9,727,051 B2 | 8/2017 | Henning et al. |
| 9,772,620 B2 | 9/2017 | Henning et al. |
| 9,891,617 B2 | 2/2018 | Henning et al. |
| 9,989,954 B2 | 6/2018 | Henning et al. |
| 10,048,676 B2 | 8/2018 | Henning et al. |
| 10,146,209 B2 | 12/2018 | Henning et al. |
| 10,209,107 B2* | 2/2019 | Oki ....................... G01D 18/00 |
| 10,564,627 B2 | 2/2020 | Henning et al. |
| 10,606,240 B2 | 3/2020 | Henning et al. |
| 10,642,252 B2 | 5/2020 | Henning et al. |
| 10,656,622 B2 | 5/2020 | Henning et al. |
| 2001/0002562 A1 | 6/2001 | Moutafis et al. |
| 2002/0066345 A1 | 6/2002 | Shepherd et al. |
| 2002/0099835 A1 | 7/2002 | Chen |
| 2003/0065424 A1 | 4/2003 | Erichsen et al. |
| 2007/0037496 A1 | 2/2007 | Habermann et al. |
| 2007/0203858 A1 | 8/2007 | Olsen et al. |
| 2007/0267996 A1 | 11/2007 | Shibasaki et al. |
| 2009/0071303 A1 | 3/2009 | Hashish et al. |
| 2009/0272245 A1 | 11/2009 | Voice et al. |
| 2009/0311944 A1 | 12/2009 | Olsen |
| 2009/0325468 A1 | 12/2009 | El-Wardany et al. |
| 2010/0227305 A1 | 9/2010 | Bakir |
| 2010/0267314 A1 | 10/2010 | Cveticanin et al. |
| 2011/0060439 A1 | 3/2011 | Lukis et al. |
| 2011/0287692 A1 | 11/2011 | Erichsen et al. |
| 2011/0294401 A1 | 12/2011 | Habermann et al. |
| 2012/0021676 A1 | 1/2012 | Schubert et al. |
| 2012/0022839 A1 | 1/2012 | Valicek et al. |
| 2012/0065769 A1 | 3/2012 | Knaupp et al. |
| 2013/0025422 A1 | 1/2013 | Chillman et al. |
| 2013/0345853 A1 | 12/2013 | Berman et al. |
| 2014/0030963 A1 | 1/2014 | Kanazawa et al. |
| 2014/0045409 A1 | 2/2014 | Zhang et al. |
| 2015/0134093 A1 | 5/2015 | Dos Reis Alipio Da Cruz |
| 2015/0205293 A1 | 7/2015 | Henning et al. |
| 2015/0205295 A1 | 7/2015 | Henning et al. |
| 2017/0255184 A1 | 9/2017 | Henning et al. |
| 2017/0322543 A1 | 11/2017 | Henning et al. |
| 2018/0088558 A1 | 3/2018 | Henning et al. |
| 2018/0107193 A1 | 4/2018 | Henning et al. |
| 2018/0150049 A1* | 5/2018 | Schranz ............... G05B 19/401 |
| 2018/0164783 A1 | 6/2018 | Henning et al. |
| 2018/0364679 A1 | 12/2018 | Henning et al. |
| 2019/0015928 A1* | 1/2019 | Hagenlocher ........ B23K 26/032 |
| 2020/0007254 A1 | 1/2020 | Hay et al. |

OTHER PUBLICATIONS

Olsen, J. et al., Advanced Error Correction Methodology Applied to Abrasive Waterjet Cutting, 2003, WJTA American Water Jet Conference, Omax Corporation, Kent, Washington, USA, Aug. 2003, pp. 1-15.

Hashish, M., "Waterjet Machine Tool of the Future," 9th American Waterjet Conference, Aug. 23-26, 1997, paper 58, 15 pages.

"Memory water jet milling," available from http://www.computescotland.com/memory-water-jet-milling-5236.php, Apr. 24, 2012, 4 pages.

* cited by examiner

NUMERICALLY CONTROLLED MACHINING

CROSS-REFERENCE TO RELATED APPLICATIONS INCORPORATED BY REFERENCE

This application claims the benefit of U.S. provisional application No. 62/594,487 filed Dec. 4, 2017. The foregoing application is incorporated herein by reference in its entirety. To the extent the foregoing application or any other material incorporated herein by reference conflicts with the present disclosure, the present disclosure controls.

TECHNICAL FIELD

The described technology is directed to the field of controlling and calibrating numerically controlled (NC) cutting or machining systems, such as abrasive-jet machining systems or other waterjet machining systems.

BACKGROUND

Numerically controlled (NC) cutting or machining involves various techniques for removing material (e.g., "milling" or "cutting") from a workpiece to create an object of a particular shape and with defined dimensions. Many common types of NC machine tools can generally be described as rigid hard cutting tools. These machine tools employ hard tooling, generally metal, which spins rapidly about one or more spindles to sculpt or chip away at a target workpiece, while moving forward along a target tool path. Other types of NC machine tools that do not employ rigid hard tooling are generally referred to as beam cutters. In such beam cutters, a beam, employing plasma, waterjet, torch (such as oxyacetylene), or laser, as examples, and operating along a defined tool path, either erodes (waterjet or abrasive-jet) or melts (laser, plasma, or torch) a workpiece, in some cases through the entire thickness of the workpiece. Etching, engraving, blind hole, or pocket milling strategies may also be employed.

For example, high-pressure fluid jets, including high-pressure abrasive waterjets, are used to cut a wide variety of materials in many different industries. Various systems are currently available to move a high-pressure fluid jet along a designated path. These include, for example, three-axis and five-axis machines. In three-axis machines the cutting tool is mounted in such a way that it can move along a plane defined by two horizontal linear axes (e.g., x-axis and y-axis) and perpendicular along a third linear axis (e.g., z-axis), namely toward and away from the workpiece. In this manner, the high-pressure fluid jet generated by the cutting tool is moved along the designated path in an x-y plane, and is raised and lowered relative to the workpiece in the z-dimension, as may be desired.

Five-axis machines include not only linear axes such as the horizontal and vertical axes just described, but also rotational axes which control the orientation of the cutting tool with respect to the workpiece. In addition to the two horizontal linear axes and a single vertical linear axis, five-axis machines enable the cutting tool to rotate about two non-parallel rotational axes (e.g., a rotary axis and a tilt axis), respectively. Generally speaking, when there are both linear and rotational degrees of freedom present in controlling of a cutting machine, it is referred to by the industry as a multi-axis machine.

Computer-aided manufacturing (CAM) processes may be used to efficiently drive or control such machines so that the cutting head moves along a designated path (generally referred to as a toolpath), such as by using two-dimensional or three-dimensional models of workpieces generated using computer-aided design (i.e., CAD models) to generate computer-executable code to drive the machines. For example, a CAD model may be used to generate instructions to drive the appropriate controls and motors of the machine to manipulate the cutting tool about its linear and/or rotational axes to cut or process a workpiece as reflected in the model.

DETAILED DESCRIPTION

To facilitate accurate cutting or other machining of complex parts using a multi-axis machine, the inventors recognized that it may be advantageous to know the precise spatial relationship between a tool of the machine and an expected tool location defined by the design of the machine, and make adjustments for the same. The expected tool location may be dependent on a number of factors, including machine configuration. For example, in a five-axis waterjet cutting machine, three linear axes, two non-parallel rotational axes, and the center line of the cutting tool are modeled to converge to form a theoretical tool center point (TCP). But in reality, due to interfering factors such as manufacturing tolerances of components, stack-up of the tolerances, assembly variations, wear and tear, or the like, the actual position of TCP may not align with the theoretical TCP predicted by the model.

Because of this, the actual path of the cutting tool may not be the same as calculated theoretical toolpath, which may result in errors in the geometries of workpiece. To improve the accuracy of NC machining systems, the inventors have recognized that compensation can be applied to the systems in an effort to align the actual and theoretical TCPs. An NC machining system (e.g., including calibration device(s) or other hardware) and/or an associated computational facility (e.g., a network or cloud based computational service) can implement a calibration process to estimate, predict, or otherwise determine offset (e.g., relative locations in a three dimensional space) between the actual TCP and theoretical TCP, and therefore enabling compensation to the system based thereon.

NC Machining Systems

Figure 1:
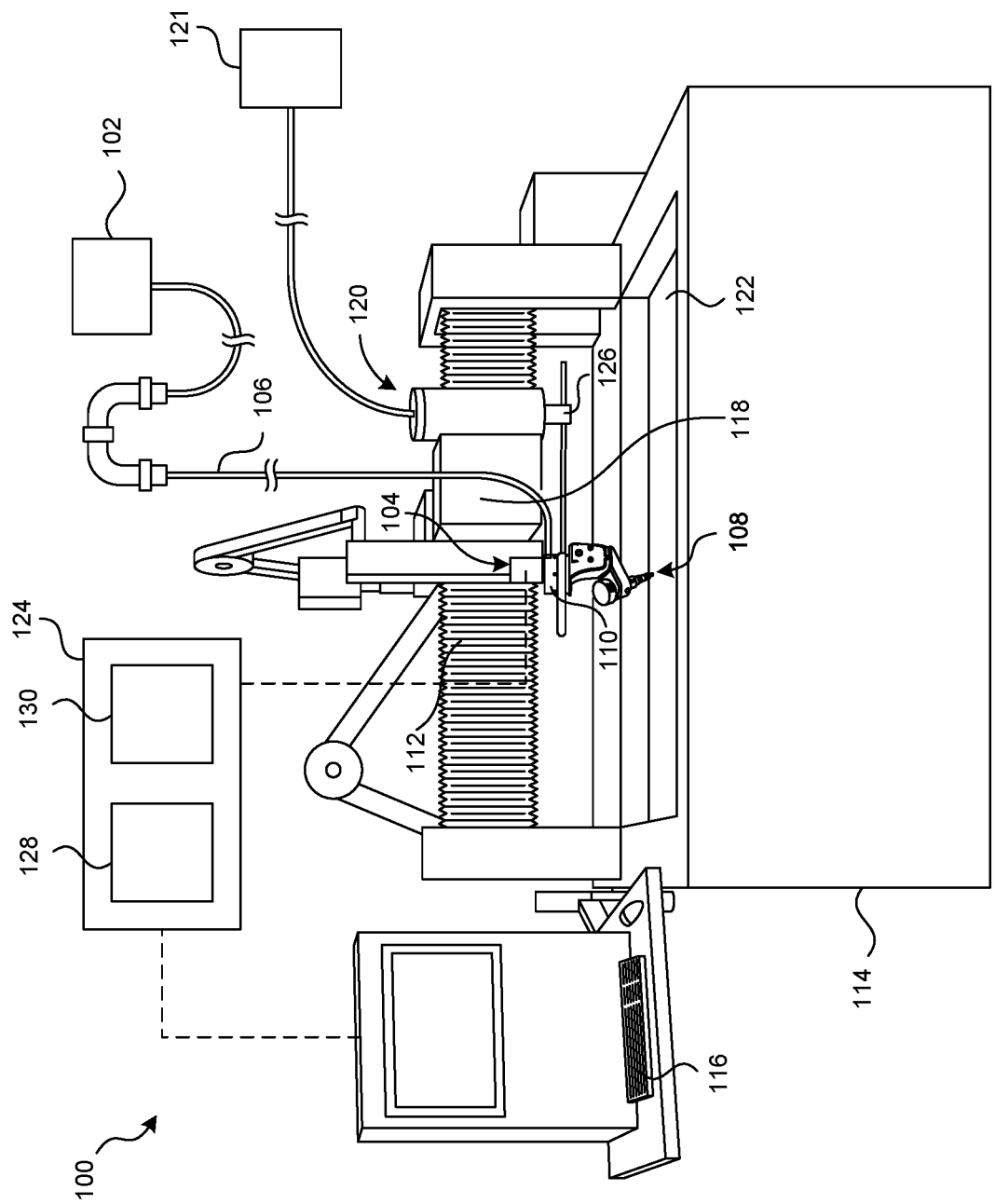
FIG. 1 is a perspective view illustrating one type of NC machining system configured to implement a tool control mechanism as well as calibration methods disclosed herein.
Figure 2B:
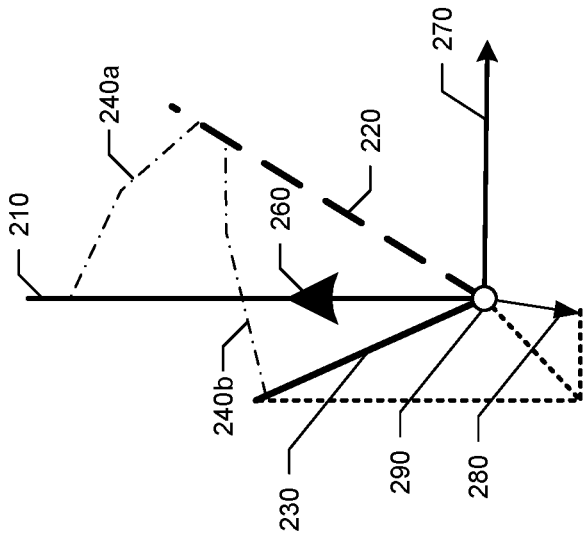
FIGS. 2a and 2b illustrate a tool control mechanism that can be implemented by the NC machining system of FIG. 1.
Figure 2A:
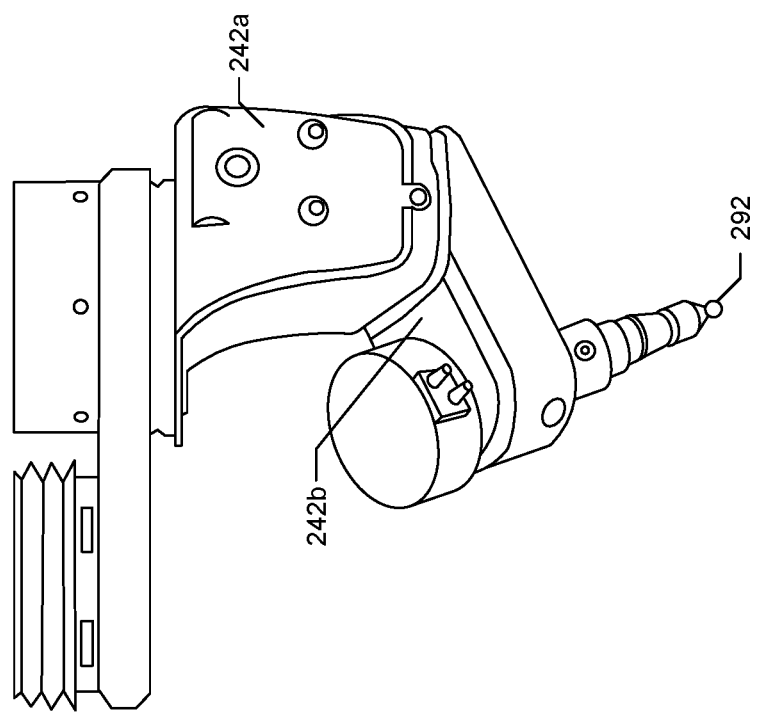

FIG. 1 is a perspective view illustrating one type of NC machining system 100 (e.g., a waterjet cutting system), configured to implement a tool control mechanism as illustrated in FIGS. 2a and 2b as well as the calibration methods disclosed herein. In some embodiments, the system 100 includes a beam generating source 102 (shown schematically) (e.g., a fluid-pressurizing device, a laser source, or a plasma source) configured to generate a beam for processing through a beam inlet (not shown), with or without being subjected to a conditioning unit (not shown), and with or without being stored in a reservoir (not shown). The system further includes a cutting head assembly 104 operably connected to the beam generating device 102 via a conduit 106 extending between the beam generating device 102 and the cutting head assembly 104.

In some embodiments, the system 100 further includes a base 114, a user interface 116, and a first actuator 112 and second actuator 118 configured to move the cutting head assembly 104 relative to the base 114 and other stationary components of the system 100 (e.g., the fluid-pressurizing device, a laser source, or a plasma source 102), or to move the base 114 relative to the cutting head assembly, (such as a stationary waterjet assembly) 104, or to move both. As will be discussed in more detail below with reference to FIGS. 2a and 2b, in some embodiments, the first actuator 112, second actuator 118 and other components implement a tool control mechanism that can move the cutting head assembly 104 along a processing path (e.g., cutting path) in two or three dimensions and tilt cutting head assembly 104 relative to the base 114, or tilt the base relative to the cutting head assembly 104, or tilt both, based on rotations about two non-parallel rotational axes. Thus, the cutting head assembly 104, or the base 114, or both, can be configured to direct a beam toward a workpiece (not shown) supported by the base 114 (e.g., held in a jig supported by the base 114) and to move relative to either the cutting head assembly 104 or the base 114, or both, while directing the jet toward the workpiece. In various embodiments, the system is configured to manipulate the workpiece in translational and/or rotational motion or a combination of both, manipulating the jet and the workpiece.

The user interface 116 can be configured to receive input from a user and to send data based on the input to a controller (124). The input can include, for example, one or more specifications (e.g., coordinates, rotational angles, geometry or dimensions) for measurements during a calibration process or for processing a cutting path. The input may also include one or more specifications (e.g., material type or thickness) of the workpiece and operating parameters (e.g., for a waterjet tool, pressure, flow rate, abrasive feed rate; for a plasma tool, electric current; for a laser tool, beam intensity).

The cutting head assembly 104 can include a beam outlet 108 (e.g., waterjet nozzle) and a control device 110 upstream from the beam outlet 108. For example, the control device 110 can be configured to receive fluid from the fluid-pressurizing device 102 via the conduit 106 at a pressure suitable for waterjet processing or gases and electric current for plasma cutting or a laser beam for laser cutting. The control device can be positioned at a different location between beam generating device 102 and the cutting head assembly 104.

The system 100 can further include a consumable delivery apparatus 120 configured to feed consumables, such as particulate abrasive or process gases, from a consumables storage container 121 to the cutting head assembly 104 or to the beam generating device 102. Within the cutting head assembly the processing beam is generated that in some embodiments can consist of a laser beam possibly surrounded by process gasses, a fluid jet with our without added and accelerated abrasive particles or a gas jet that is transformed into a plasma beam by applying electric current. In some embodiments the consumable delivery apparatus 120 is configured to move with the cutting head 104 relative to the base 114, or vice versa. In other embodiments, the consumable-delivery apparatus 120 can be configured to be stationary while the cutting head assembly 104 moves relative to the base 114. The controller 124 can be configured to vary the demanded power at the beam device or within the system. The system can consist of one or more cutting heads that can be controlled individually and can be applying same or different parameters (orifice size, mixing tube size, abrasive size, abrasive type, abrasive feed rate, etc.).

The base 114 can include a diffusing tray 122, such as, among others, one configured to hold a pool of fluid positioned relative to the jig so as to diffuse the remaining energy of the jet from the cutting head assembly 104 after the beam passes through the workpiece. The system 100 can also include the controller 124 (shown schematically) operably connected to the user interface 116, the first actuator 112, and the second actuator 118, in a variety of fashions or steps of hardware. In some embodiments, the controller 124 is also operably connected to a consumable metering device 126 (shown schematically) of the consumable delivery apparatus 120. In other embodiments, the consumable delivery apparatus 120 can be without the metering device 126 or the metering device 126 can be configured for use without being operably associated with the controller 124. The metered consumables can be but are not limited to process gases, electric power, abrasive garnet.

The controller 124 can include at least a processor 128 and memory 130 and can be programmed with instructions (e.g., non-transitory instructions contained on a computer-readable medium) that, when executed, control operation of the system 100 including the calibration processes as disclosed herein. In some embodiments, the controller 124 are located locally with the base 114 or other parts of the NC machining system 100. In some embodiments, at least some components of the controller 124 are located remotely. For example, at least some components of the controller 124 can be implemented on one or more remote computing devices, such as in a cloud-based system.

The system 100 can be configured to contain one or more independent or connected motion control units. The system can be configured in various ways that allow perpendicular, rotational and/or angular cutting of workpieces of different shape. Embodiments of the system can include but are not limited to cantilever, gantry, bridge, multi-axis kinematics, 6-axis robot, rotary, and hexapod style machines. In various embodiments, the system is suited to cutting workpieces of a wide variety of thicknesses, including workpieces of negligible thicknesses. In various embodiments, the system 100 uses various fluids other than water and can also include gases. In various embodiments, the system 100 is adapted to cut workpieces of a variety of three-dimensional shapes. In some embodiments, the jet can cut at any angle relative to the workpiece.

Tool Control Mechanism

FIG. 2a illustrates an implementation of a tool control mechanism of a multi-axis NC machining system (e.g., system 100 of FIG. 1) in accordance with some embodiments and FIG. 2b illustrates one embodiment of a theoretical model of the tool control mechanism of FIG. 2a. With reference to FIG. 2b, the theoretical model includes two non-parallel rotational axes (i.e., rotary axis 210 and tilt axis 220) and a tool axis 230 (e.g., representing a centerline of a waterjet nozzle). In theory, the two rotational axes 210 and 220 and the tool axis 230 have a common intersection point 290 (i.e., the theoretical TCP), which will remain at the same point (e.g., the origin point at coordinates (0, 0, 0)) in a 3-dimensional coordinate system defined by three orthogonal linear axes (i.e., x-axis 280, y-axis 270, and z-axis 260 that follow right-hand rule), regardless of the angular position of either rotational axis.

The angle between the tool axis 230 and the tilt axis 220 is fixed and rendered by a frame indicator 240b (e.g., a theoretical representation of frame 242b in FIG. 2a). Such an arrangement enables rotation of the tool axis 230 about the tilt axis 220 (generally understood as rotating the tilt axis 220). Similarly, the angle between the tilt axis 220 and the rotary axis 210 is fixed and rendered by a frame indicator 240a (e.g., a theoretical representation of frame 242a in FIG. 2a). Such an arrangement enables rotation of the tool axis 230 about the rotary axis 210 (generally understood as rotating the rotary axis 210). In the example of FIG. 2b, the angle between the tool axis 230 and the tilt axis 220 and the angle between the tilt axis 220 and the rotary axis 210 are the same. In various embodiments, these two angles can be different or generally the same (e.g., within a threshold difference of each other). The orientation of the tool axis 230 (typically represented in a unit vector form) can be defined as a function of the angular positions of the two rotational axes.

With reference to FIG. 2a, in reality, due to interfering factors such as manufacturing tolerances of components, stack-up of the tolerances, assembly variations, wear and tear, or the like, the actual TCP 292 (e.g., the tip of a hard rigid cutting tool, a defined point that lies on a center line of a waterjet nozzle, or the like) is often offset from the rotational axes and the theoretical TCP 280 by some amount. The calibration process as disclosed herein seeks to determine the offset.

Conventional Calibration Methods

Conventional methods used to measure the tool offset may include instructing an NC machining system to rotate the tool (fitted with a probe that represents the location of actual TCP) to known angular positions with respect to a rotational axis, and using measuring device(s) (e.g., a dial indicator) to determine the locations of the probe (by measuring the surface of the probe). For example, at first the tool is rotated to a 0-degree position as defined by the NC machining system, and a measuring device is mounted to measure an x-axis location (recorded as $x_0$) of the probe. The tool is then rotated to a 180-degree position, and the x-axis measuring device is used to measure a second x-axis location (recorded as $x_1$) of the probe. The tool is further rotated to a 90-degree position, and a measuring device is mounted to measure a y-axis location (recorded as $y_0$) of the probe. Finally the tool is rotated to a 270-degree position, and the y-axis measuring device is used to measure a second y-axis location (recorded as $y_1$) of the probe. The tool's runout can be determined by calculating the difference between either the x-axis or y-axis measurements:

$$\text{runout} = x_1 - x_0 \text{ or } y_1 - y_0$$

The center of the rotation ($x_c$, $y_c$) and radial offset R relative to the $x_0$ and $y_0$ locations can be computed by averaging and differencing the coordinates:

$$x_c = \frac{x_1 + x_0}{2}$$

$$y_c = \frac{y_1 + y_0}{2}$$

$$R = \sqrt{(x_1 - x_0)^2 + (y_1 - y_0)^2}$$

These information can be used either to make physical adjustments on the tool itself, or can be incorporated into the NC machining system's tool motion control software to compensate for cutting tool offset errors. The conventional method is often used in an iterative approach where the method is repeated until the radial offset or runout is within a predetermined tolerance threshold.

The conventional method does not provide any information about the shape of the offset errors. As tolerance requirements for determining a tool's exact position relative to its theoretical position become stricter, the shape of the tool's motion can be an important factor in determining offsets. Although offsets were assumed to be constant in the past, in systems where higher precision is desired, the inventors have recognized that the offsets may continually change and tend to be non-linear as a function of the desired angular position. Because the conventional method does not provide any information about the shape of the TCP offset errors, more precise methods are needed to model the exact tool offset positions.

Circular Model Data Fitting

When a tool is rotated about a rotational axis (generally understood as rotating the rotational axis), it is assumed that the actual TCP will rotate around the rotational axis and create a circular path about the axis. If the x- and y-axis coordinates of the actual TCP's position are recorded as it rotates around the rational axis, the diameter of the tool path can be estimated by assuming that the measurements fit a circular geometry. From this diameter, the radial offset of the tool relative to the center of the rotation can be determined.

If the measurements of the actual TCP's initial position correspond to a known starting rotational angle of the rotational axis, then all of the measurements of the actual TCP's position as the tool rotates around the rotational axis are relative to the initial position, and the orientation of the tool's offset relative to a corresponding rotational angle of the rotational axis can be determined.

Figure 3:
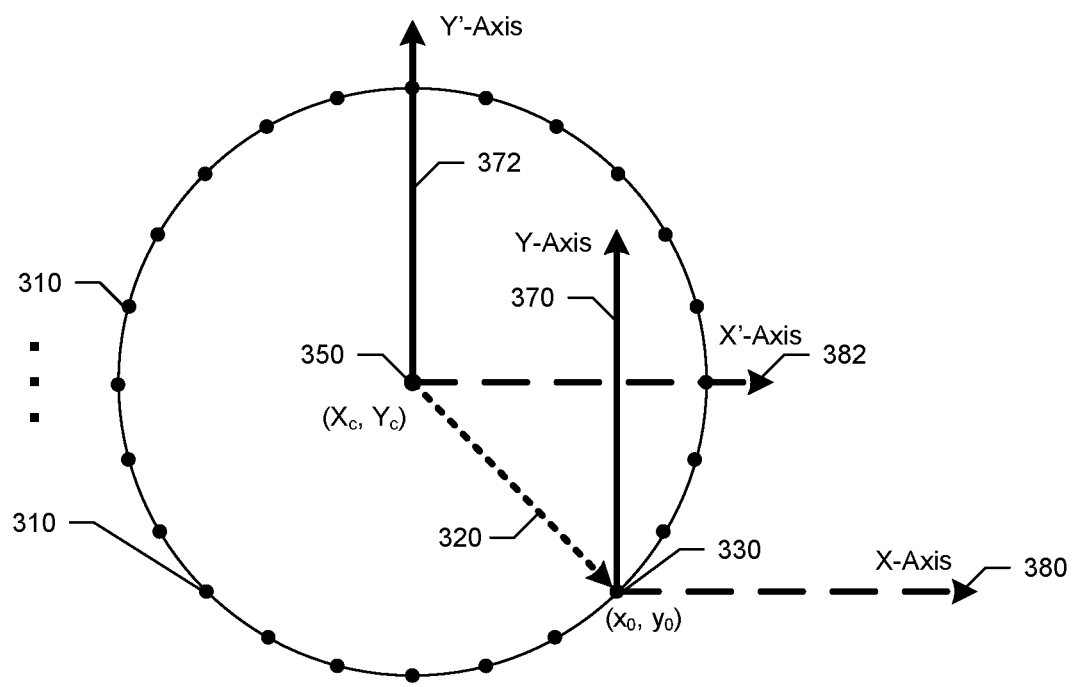
FIG. 3 illustrates how offsets can be determined based on circular model data fitting in accordance with some embodiments.

FIG. 3 illustrates how offsets can be determined based on circular model data fitting in accordance with some embodiments. With reference to FIG. 3, data set 310 includes x- and y-axis coordinates of a set of n measured actual TCP's positions as the tool rotates around a rational axis 350 (presumably perpendicular to the x-y plane defined by x-axis 380 and y-axis 370). From the data set 310, in some embodiments, the NC machining system or an associated computational facility computes a centroid ($x_c$, $y_c$) of the measured positions, and creates a new coordinate system (based on x'-axis 382 and y'-axis 372) centered at this centroid. For example, $x_c$ and $y_c$ can be computed by taking the average of all data points in data set 310:

$$x_c = \frac{1}{n}\sum_{i=0}^{n-1} x_i$$

$$y_c = \frac{1}{n}\sum_{i=0}^{n-1} y_i$$

In some embodiments, the precision in finding $x_c$ and $y_c$ depends on the number of data points and how uniformly distributed the measurements are taken.

In some embodiments, the NC machining system or an associated computational facility creates a vector 320 from the centroid to a first data point 330 within the data set 310 where measurement coordinates were zeroed (i.e., coordinates ($x_0$, $y_0$) of the first data point is (0, 0) under the original x-y coordinate system). The NC machining system or an associated computational facility can compute a phase angle, φ, between the new x'-axis and the vector 320 based on:

$R \cos \varphi = -x_c$ $R \sin \varphi = -y_c$ where R represents the radius of a circle fitted to the n measured positions in data set 310. In various embodiments, a variety of circle fitting methods as understood by a person of skill can be used to compute $x_c$, $y_c$, and R.

With these computations, in some embodiments, the NC machining system or an associated computational facility determines the tool offset relative to the rotational axis 350 as a function of a rotation angle of the rotational axis 350 as follows:

$x' = R \cos(\theta + \varphi)$ $y' = R \sin(\theta + \varphi)$ where x' and y' represent coordinates of actual TCP's offset position under the new coordinate system based on x'-axis 382 and y'-axis 372, R represents the radius of a circle fitted to the data set 310, θ represents the rotation angle of the rotational axis 350, and φ represents the phase angle.

In matrix form, the function can be expressed as follows:

$$\begin{bmatrix} x' \\ y' \end{bmatrix} = \begin{bmatrix} \cos\theta & -\sin\theta \\ \sin\theta & \cos\theta \end{bmatrix} \begin{bmatrix} x'_0 \\ y'_0 \end{bmatrix}$$

where $x_0'$ and $y_0'$ are the coordinates of the first data point 330 under the new x'-y' coordinate system, when the rotational angle θ is at its initial zero reference position. $x_0'$ and $y_0'$ can be computed as follows:

$x_0' = -x_c$ $y_0' = -y_c$

In many cases, this method is more precise than the conventional method that measures the TCP at 4 locations where the tool is rotated in 90 degree increments for determining tool center point offsets. The offsets computed by the NC machining system or an associated computational facility in accordance with the circular model data fitting method may be used either to make physical adjustments on the tool itself, or can be incorporated into a corresponding NC system's tool motion control software to compensate for tool offset errors or a combination of the two.

Geometric Model Data Fitting

In many cases, the path that the actual TCP follows is not a true circle about the axis of rotation, but is irregular in shape. Approximate shapes can appear like an ellipse, egg shaped, peanut shaped, etc. This may be due to a wide variety of reasons, such as the manufacturing tolerances, assembly tolerances, runouts in drive components, varying external loads on the various components within the tool, and wear and tear on the mechanism. Uncertainties introduced in the measurement process may also contribute to the problem. For example, the tool center is actually a theoretical "point" in space that cannot be directly measured, but is indirectly measured by measuring the surface of a probe or other tooling reference. Thus deviations in the actual measured surface relative to the true center of measure (either by manufacturing tolerances and/or assembly tolerances) affects the accuracy of the measurements. Also, the actual contacting point of measuring device on the measured surface may be different than a desired point of contact. For example some form of debris on the measured surface can move a flat surface of a mechanical indicator to a different location thus the actual measurement becomes inaccurate.

Figure 4:
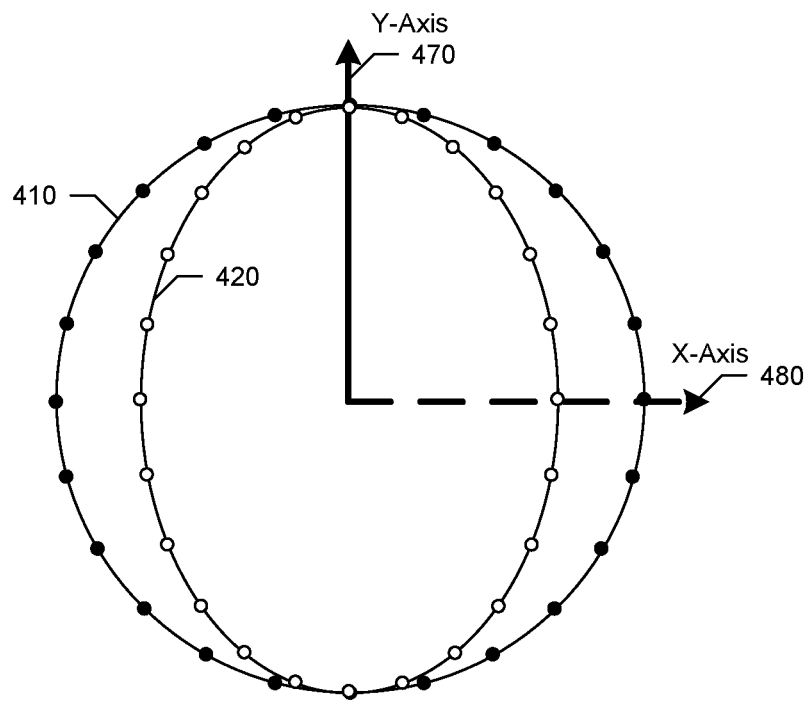
FIG. 4 illustrates measured offsets when an axis of rotation is not perpendicular to a measurement plane.

To address these problems, and to further improve the accuracy of calibration, geometrical model based data fitting can be implemented to determine the TCP offsets. In prior discussions, the measurement plane (e.g., the x-y plane of FIG. 3) is assumed to be perpendicular to the axis of rotation. With a constant TCP offset, a circular path about the rotational axis is supposedly observable on the measurement plane. However, this would not be the case when the measurement plane is not perpendicular to the axis of rotation. Illustratively, FIG. 4 shows a circle 410 representing measured coordinates of actual TCP offsets when the axis of rotation is perpendicular to the measurement plane defined by x-axis 480 and y-axis 470. FIG. 4 also shows another shape (e.g., an ellipse) 420 representing measured coordinates of the same actual TCP offsets when the axis of rotation is rotated 45 degrees about the y-axis relative to the measurement plane.

Indeed, in theory, tilting the axis of rotation away from being perpendicular to the measurement plane produces an elliptical shape of actual TCP offset path that can be observed on the measurement plane. Therefore, using the conventional four quadrant offset determination or the circular model based data fitting to any elliptical data set (e.g., corresponding to an underlying shape 420) will cause positional impreciseness and errors at almost all locations. Additionally, as discussed above, the hardware attached to the tool control mechanism, the tolerance stack ups and variation in the assembly and maintenance, and wear and tear during the life of the mechanism, may render the actual path of tool offset relative to an axis of rotation to be non-circular. Accordingly, fitting a known geometrical model to a measured data set may yield greater precision, while minimizing overall errors and can be used to suppress outlier measurements. The centroid of a fitted geometrical model can be calculated along with its orientation on the measurement plane. From this information, a parametric model of the TCP path can be determined in a more precise manner.

It should be mentioned that various geometric shapes (e.g., circular, elliptical, parabolic, banana shape, egg shaped, or the like) may be utilized for data fitting, depending on the state of the NC machining system. In this regard, knowledge of the NC machining system's tool control mechanism along with knowledge of the measurement device(s) and the measurement planes, may help with the initial choices of geometric models. Statistics may be utilized in analyzing measured data points with respect to the specific geometry that is being fitted to the data, so as to determine whether the specific geometry is an appropriate geometry for the data set. For example, an acceptance threshold can be set up where an acceptable fitted geometry must fit within 2 standard deviations of the error between the actual measured data and the fitted geometry. By having an acceptable threshold or other fit criteria, the fitting geometry can be changed so that the residual errors are minimized based on geometry type. Also by conducting multiple rounds of measurements using the same setup (e.g., same order, procedure, measurement specification, combinations of the same or the like) each round, a repeatability assessment of the mechanism can be used to determine suitability of the calibration model to the actual system. By studying the errors and repeatability of the data points, troubleshooting the mechanism can be accomplished.

Illustrative Calibration Process

Figure 5:
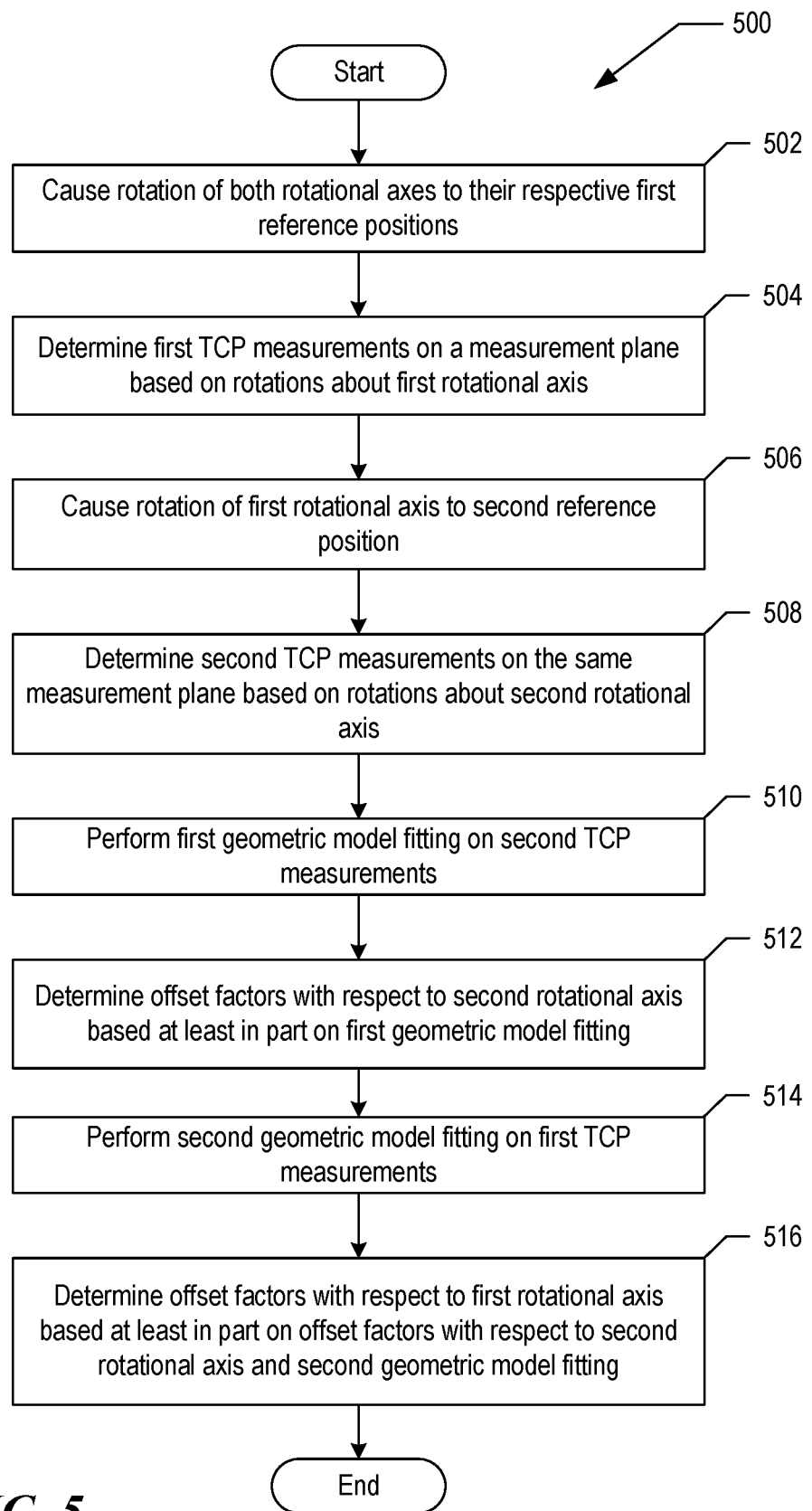
FIG. 5 is a flow diagram showing an illustrative calibration process that can be performed by the NC machining system of FIG. 1.

FIG. 5 is a flow diagram showing an illustrative calibration process 500 that can be performed by an NC machining system (e.g., system 100) implementing a tool control mechanism as illustrated in FIGS. 2a and 2b. In preparation for the calibration process 500, a probe for TCP (e.g., a ball stem assembly including a tooling ball) and measuring devices (e.g., dial indicators) can be set up in association with the NC machining system, so that the calibration process 500 is automated. For example, the setup can be performed by a system operator in accordance with suitable instruction manual(s).

In accordance with the tool control mechanism as illustrated in FIGS. 2a and 2b, an example tool rotation sequence is to first rotate the tool for angle $\theta_Z$ about the mechanism's z-axis (which is coincident with the rotary axis 210), then rotate angle $\alpha$ (the geometrical constraint of an angle between the rotary axis 210 and the tilt axis 220), and finally rotate the tool for angle $\theta_T$ about the tilt axis 220. This rotation sequence $R_Z(\theta_Z) R_y(\alpha) R_Z(\theta_T)$ can be expressed as follows:

$$\begin{bmatrix} \cos\theta_Z & -\sin\theta_Z & 0 \\ \sin\theta_Z & \cos\theta_Z & 0 \\ 0 & 0 & 1 \end{bmatrix} \begin{bmatrix} \cos\alpha & 0 & \sin\alpha \\ 0 & 1 & 0 \\ -\sin\alpha & 0 & \cos\alpha \end{bmatrix} \begin{bmatrix} \cos\theta_T & -\sin\theta_T & 0 \\ \sin\theta_T & \cos\theta_T & 0 \\ 0 & 0 & 1 \end{bmatrix}$$

Based on this example rotational sequence, a corresponding forward kinematic model utilized to determine 3-dimensional TCP offsets ($X_{offset}$, $Y_{offset}$, $Z_{offset}$) in the x-y-z coordinate system (as illustrated in FIG. 2b), based on a rotary axis rotational angle $\theta_Z$ and a tilt axis rotational angle $\theta_T$, can be expressed as follows:

$$\begin{Bmatrix} X_{offset} \\ Y_{offset} \\ Z_{offset} \\ 1 \end{Bmatrix} = \begin{bmatrix} \cos\theta_Z & -\sin\theta_Z & 0 & 0 \\ \sin\theta_Z & \cos\theta_Z & 0 & 0 \\ 0 & 0 & 1 & 0 \\ 0 & 0 & 0 & 1 \end{bmatrix} \begin{bmatrix} \cos\alpha & 0 & \sin\alpha & X_Z \\ 0 & 1 & 0 & Y_Z \\ -\sin\alpha & 0 & \cos\alpha & Z_Z \\ 0 & 0 & 0 & 1 \end{bmatrix}$$

$$\begin{bmatrix} \cos\theta_T & -\sin\theta_T & 0 & 0 \\ \sin\theta_T & \cos\theta_T & 0 & 0 \\ 0 & 0 & 1 & 0 \\ 0 & 0 & 0 & 1 \end{bmatrix} \begin{Bmatrix} X_T \\ Y_T \\ Z_T \\ 1 \end{Bmatrix}$$

The above matrix operation can be deduced from classical Denavit-Hartenberg principles for kinematic chains. This matrix operation can represent the forward kinematic model in accordance with some embodiments of the technology disclosed herein.

In the forward kinematic model, tilt axis offsets ($X_T$, $Y_T$, $Z_T$) represent fixed TCP offsets relative to a tilt axis coordinate system. Illustratively, tilt axis offsets can be defined as 3-dimensional coordinates of the probe or other indicator of TCP (e.g., ball stem assembly's center point of tooling ball) in accordance with a tilt axis coordinate system, where the z-axis of the tilt axis coordinate system is coincident with the tilt axis 220. When the rotational angle $\theta_T$ of tilt axis 220 and the rotational angle $\theta_Z$ of the rotary axis 210 are both 0 degrees, the x-axis of the tilt axis coordinate system are defined as residing in the x-z plane of FIG. 2b. Accordingly, the y-axis of the tilt axis coordinate system is defined in accordance with the conventional right-hand rule.

In the forward kinematic model as discussed above, rotary axis offsets ($X_Z$, $Y_Z$, $Z_Z$) represent the coordinates of the origin of the tilt axis 220 relative to the origin of the rotary axis 210. In the theoretical world, the origins of both of these axes are coincident. But due to manufacturing and assembly tolerances, wear and tear, etc., they are not. The rotary axis offsets are coordinates in the rotary axis coordinate system, where the z-axis of the rotary axis coordinate system is coincident with the rotary axis 210. The x-axis of the rotary axis coordinate system points in the direction of the $\theta_T$ angle, and the y-axis of the rotary axis coordinate system can be defined in accordance with the conventional right-hand rule.

One of the goals of the calibration process 500 is to estimate or otherwise determine the tilt axis offsets ($X_T$, $Y_T$, $Z_T$) and rotary axis offsets ($X_Z$, $Y_Z$, $Z_Z$), so that given a known angle $\alpha$ between the rotary axis 210 and the tilt axis 220, the NC machining system may calculate 3-dimensional TCP offsets ($X_{offset}$, $Y_{offset}$, $Z_{offset}$) as a function of rotary axis rotational angle $\theta_Z$ and tilt axis rotational angle $\theta_T$, and compensate for the calculated TCP offsets via 3-dimensional motion control (e.g., 3-dimensional linear motion control of the cutting head assembly 104 or base 114 as illustrated in FIG. 1, independent from rotations).

With reference to FIG. 5, in step 502, the NC machining system or an associated computational facility causes rotation of both rational axes (e.g., the rotary axis 210 and the tilt axis 220 as shown in FIG. 2b) to their respective reference positions. Illustratively, the NC machining system may cause the tilt axis 220 to rotate to a 0 degree position (as defined by the NC machining system), and the rotary axis 210 to a 0 degree position (as defined by the NC machining system). In step 504, the NC machining system or an associated computational facility determines first TCP measurements on a measurement plane based on rotations about a first rotational axis. For example, the NC machining system may record a set of x- and y-coordinates that are collected from the measuring devices (which are arranged in a way to measure a two-dimensional location of the probe on the measurement plane), for each location of the probe when the rotary axis 210 is caused to rotate from 0 to 360 degrees, or from −360 to +360 degrees in multiple step increments, for example in 5 degree step increments.

In step 506, the NC machining system or an associated computational facility causes rotation of the first rotational axis to a second reference position. For example, the NC machining system may cause the rotary axis 210 to rotate to a convenient location that will prevent the probe or nozzle from damaging the measuring devices when the tilt axis 220 rotates within a defined range. In some embodiments, the first reference position of the rotary axis 210 may achieve this purpose. In other embodiments, the second reference position can be any angle because the second rotational axis (e.g., the tilt axis 220) may freely rotate in a manner not interfered by the measuring devices. For example, certain non-contact measuring devices (e.g., those that are laser, RADAR, or optics based) do not need physical contact with the probe or other indicator of TCP to obtain location measurements.

In step 508, the NC machining system or an associated computational facility determines second TCP measurements on the same measurement plane based on rotations about the second rotational axis. For example, the NC machining system may record a set of x- and y-coordinates that are collected from the same measuring devices (as arranged and used in step 504), for each location of the probe when the tilt axis 220 is caused to be rotated about its range of motion in various step increments, for example from −180 to 180 degrees in 5 degree step increments.

In step 510, the NC machining system or an associated computational facility performs a first geometric model fitting on the second TCP measurements for determining offset factors with respect to the second rotational axis (e.g., the tilt axis 220). The NC machining system or an associated computational facility fits a first geometric model to the set of x- and y-coordinates in the second TCP measurements data. Various model fitting methods (e.g., least-square error based methods) known to a person of skill in the art can be used to achieve this. As part of the model fitting process, the NC machining system determines the geometrical properties (e.g., centroid, orientation, etc.) of the fitted shape.

Based on the results from the geometrical fitting, the NC machining system or an associated computational facility transforms the TCP measurements ($x_{measured}(\theta_T)$, $y_{measured}(\theta_T)$) that was taken at a zero rotational angle about the tilt axis 220 (i.e., $\theta_Z=0$) into a new set of coordinates that are centered about the centroid of the geometrical fit:

$$\begin{bmatrix} x' \\ y' \end{bmatrix} = \begin{bmatrix} x_{measured}(\theta_T) - x_{TC} \\ y_{measured}(\theta_T) - y_{TC} \end{bmatrix}$$

In some embodiments, the calculation can be performed by the NC machining system or an associated computational facility based on second TCP measurements taken at a different reference position about the tilt axis 220.

If the rotary axis was rotated to a different reference position in step 506 the coordinates will need to be rotated back to the zero rotation reference positions, i.e. $\theta_Z=0$. A reason to move the rotary axis, $\theta_Z$, can be to avoid interference with the measurement tooling.

$$\begin{bmatrix} x'' \\ y'' \end{bmatrix} = \begin{bmatrix} \cos\theta_Z & -\sin\theta_Z \\ \sin\theta_Z & \cos\theta_Z \end{bmatrix} \begin{bmatrix} x' \\ y' \end{bmatrix}$$

In step 512, the NC machining system or an associated computational facility determines offset factors with respect to the second rotational axis (e.g., the tilt axis 220) based at least in part of the first geometric model fitting. The NC machining system may calculate the x, y, and z-coordinates ($X_T$, $Y_T$, $Z_T$) of the tilt axis offsets. To achieve this, in some embodiments, the NC machining system or an associated computational facility creates a new x- and y-coordinate dataset using the forward kinematic model as discussed above, with:

1) the $X_T$ and $Y_T$ values as determined from:

$$X_T = \frac{x''}{\cos\alpha}$$

$$Y_T = y''$$

2) $Z_T$ set to zero,
3) $X_Z$, $Y_Z$, and $Z_Z$ all set to zero,
4) α being the mechanism's physical angle (e.g., 30 degrees) between the tilt axis 220 and the rotary axis 210,
5) $\theta_Z$ set to a convenient reference position in accordance with step 506, and
5) $\theta_T$ is varied within a certain range in accordance with the rotational angles of the tilt axis 220 in step 508 (e.g., from −180 to 180 degrees) to create the new data set.

Next, the NC machining system or an associated computational facility creates a partially compensated data set by evaluating the error between the second TCP measurement dataset and the new dataset created based on the forward kinematic model. The inventors believe that the x- and y-coordinate errors between these two sets of data are largely due to the fact that $Z_T$ was set to zero in the creation of the new dataset. The partially compensated data set of ($X_{PC}(\theta_T)$, $Y_{PC}(\theta_T)$) can be created from the measured data as follows:

$$\begin{bmatrix} X_{PC}(\theta_T) \\ Y_{PC}(\theta_T) \end{bmatrix} = \begin{bmatrix} x_{measured}(\theta_T) - X_{offset}(\theta_T) \\ y_{measured}(\theta_T) - Y_{offset}(\theta_T) \end{bmatrix} + \begin{bmatrix} x_{TC} \\ y_{TC} \end{bmatrix}$$

The NC machining system or an associated computational facility then fits an additional geometric model (e.g., an ellipse) to the partially compensated data set and computes the centroid ($X_0$, $Y_0$) of the additional geometric model. The NC machining system or an associated computational facility may calculate $Z_T$ as follows:

$$Z_T = \frac{X_0}{\sin\alpha}$$

In step 514, the NC machining system or an associated computational facility performs a second geometric model fitting on the first TCP measurements for determining offset factors (e.g., the rotary axis offsets) with respect to the first rotational axis (e.g., the rotary axis 210). Because it is assumed that the actual TCP relative to the tilt axis 220 remains constant regardless of the tilt axis rotation (e.g., due to geometry fixed by frame or other hardware), for any given tilt axis position the actual TCP is considered to have a fixed geometrical offset relative to the axis of rotation. If the actual TCP's location is known relative to the tilt axis 220, and the actual TCP's position is known relative to the rotary axis 210, the location of the tilt axis 220 relative to the rotary axis 210 (e.g., the rotary axis offsets) can be determined.

To achieve this, the NC machining system or an associated computational facility fits the second geometric model to the set of x- and y-coordinates in the first TCP measurements data. As part of the model fitting process, the NC machining system or an associated computational facility determines the geometrical properties of the fitted shape, (e.g., the centroid ($x_{ZC}$, $y_{ZC}$) of an ellipse) on the measurement plane.

In step 516, the NC machining system or an associated computational facility determines offset factors with respect to the first rotational axis (e.g, the rotary axis 210) based at least in part on offset factors with respect to the second rotational axis (e.g., the tilt axis 220) and the second geometric model fitting. Illustratively, the NC machining system or an associated computational facility calculates the rotary axis offsets ($X_Z$, $Y_Z$, $Z_Z$) by inverting the forward kinematic model and solving for the rotary axis offsets.

Once the tilt axis offsets ($X_T$, $Y_T$, $Z_T$) and rotary axis offsets ($X_Z$, $Y_Z$, $Z_Z$) are determined, and the angle α between the rotary axis 210 and the tilt axis 220 known, the NC machining system or an associated computational facility may calculate 3-dimensional TCP offsets ($X_{offset}$, $Y_{offset}$, $Z_{offset}$) as a function of rotary axis rotational angle $\theta_Z$ and tilt axis rotational angle $\theta_T$. These two angles may be included in any tool path for machining a workpiece. When the NC machining system executes such a tool path with rotations about the two rotational axes, the NC machining system may compensate for the calculated TCP offsets via 3-dimensional motion control (e.g., 3-dimensional linear motion control of the cutting head assembly 104 or base 114 as illustrated in FIG. 1, independent from rotations).

In some embodiments, the NC machining system executes a tool path locally, and computes the 3-dimensional motion control compensation locally in real-time as the tool path is executed. In some embodiments, the NC machining system executes a tool path locally, and receives additional instructions on corresponding 3-dimensional motion control compensations that are computed remotely. With proper motion control compensation performed as described above, the NC machining system can produce an actual cutting path that matches the tool path with better accuracy and precision.

As can be understood by person of skill in the art, the calibration process as disclosed herein includes automatic measurement error compensation through comparison of actual measured data to geometrical curve fitting. Ellipses may be preferred shape for geometrical curve fitting because they are generic in nature in that they can be used to model circles to ovals to long pencil shaped errors, and are well defined to determine off-axis data 3 dimensional data from 2 dimensional measurements.

Generally speaking, through the use of a higher number of measurement data points, greater accuracy in determination of the tool offsets is achieved. Large data sets of the measurements may provide diagnostic information about the state of the tool control mechanism in that the measurements show the true motion of the mechanism that can be compared to the theoretical motion of the mechanism. The shape and magnitude of deviations provide information on whether mechanical problems with the mechanism that needs to be corrected before use.

In some embodiments, the geometrical model fitting approach is not limited to a mathematical geometrical model, but can be a large point cloud of 3 dimensional data from a large number rotational and tilt positions where a look-up table can be used to determine geometrical data fits. Cloud data can also be beneficial in determining if there are directional dependencies in the data. Data can be averaged to average directional dependence, or separate geometrical models can be implemented based on the direction of the rotational axis, especially if there are reversal or backlash errors in the mechanism's axis of rotation.

Also, the method is not limited to static measurements, but the data can be collected dynamically with the mechanism moving in real time by simultaneously recording motor joint angles and tool positions. Calibration maps can then be tuned to be matched based on actual operating speeds.

The calibration process as disclosed herein does not require movement in the direction of the machine's x, y, or z axis, therefore avoiding the error uncertainties caused by such linear movements (e.g., as controlled by actuators 118 and 112 of FIG. 1) and improving the accuracy in determination of the offsets. The calibration process as disclosed herein determines offsets specific to tool control mechanism. This enables the offsets to follow the specific mechanism once calibration has been performed, therefore re-calibration is not required if the mechanism is moved from one machine to another.

Because the offsets are mechanism specific, i.e. not related to the accuracy of the overall machine's positioning accuracy of the tilting mechanism, an analysis of the offsets can be used to reverse engineer deviations of the mechanism for troubleshooting purposes.

As disclosed herein, in accordance with some embodiments, the NC machining system or an associated computational facility fully automates the calibration process which eliminates human errors that can negatively impact the overall accuracy of the determination of the tool offsets. Geometrical curve fitting of the data can further eliminate the subjectivity of human interpretation of data points as being good or bad.

Figure 6:
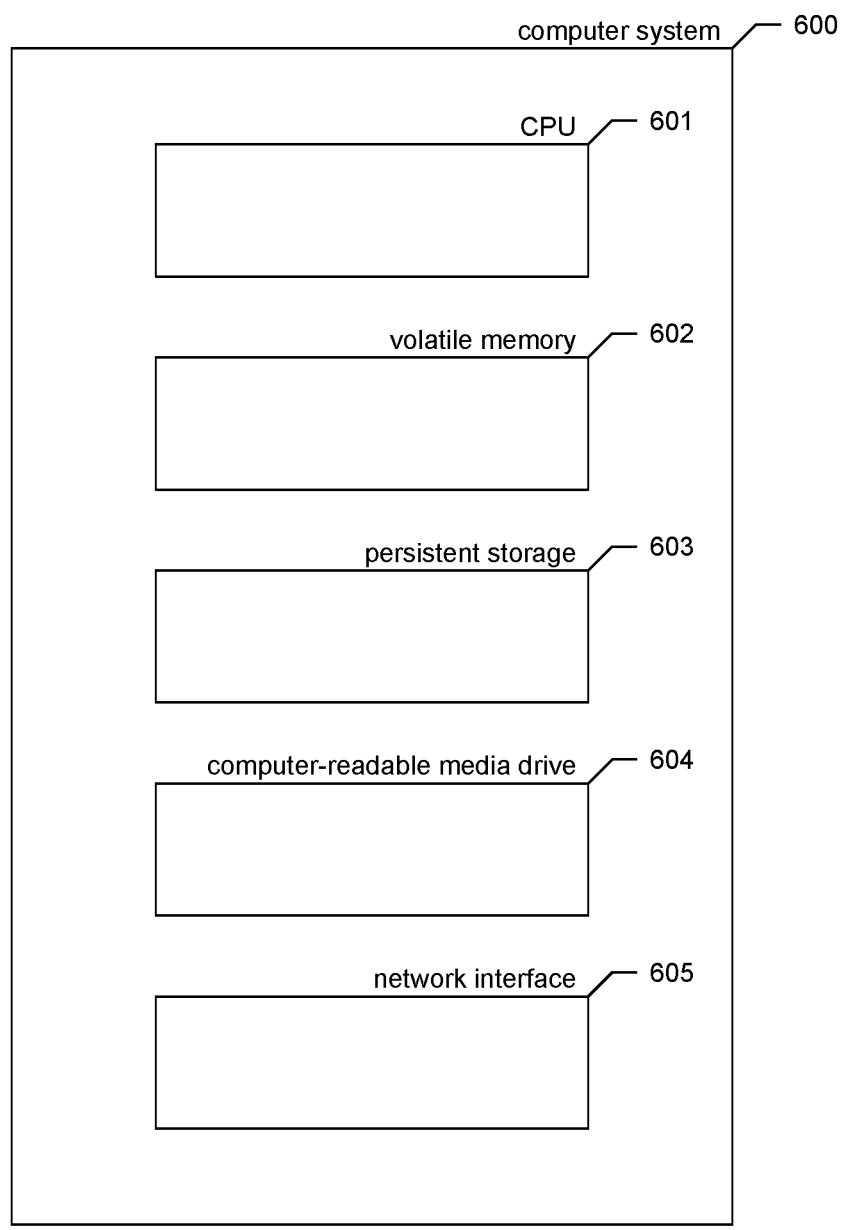
FIG. 6 is illustrates a computer device or system that can implement at least portions of the technology disclosed herein.

Several implementations of the disclosed technology are described above in reference to the figures. The computing systems or devices (e.g., computer system 600 as illustrated in FIG. 6) on which the described technology may be implemented can include one or more central processing units (e.g., CPU 601), memory (e.g., volatile memory 602), input devices (e.g., keyboard and pointing devices), output devices (e.g., display devices), storage devices (e.g., persistent storage 603 such as disk drives), and network devices (e.g., network interface 605). The memory and storage devices are computer-readable storage media that can store instructions that implement at least portions of the described technology. In some embodiments, the computing devices also includes computer-readable media drive 604 (e.g., CD, DVD, or solid state memory devices) that can read instructions stored on other computer-readable media. In addition, the data structures and message structures can be stored or transmitted via a data transmission medium, such as a signal on a communications link. Various communications links can be used, such as the Internet, a local area network, a wide area network, a point-to-point dial-up connection, or wireless. Thus, computer-readable media can comprise computer-readable storage media and computer-readable transmission media.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A non-transitory computer-readable medium having contents configured to cause a computing system to perform a method for calibrating a tool control mechanism for a waterjet cutting machine including a rotary axis and a tilt axis, the method comprising:
   causing a tool center indicator coupled with the waterjet cutting machine to rotate about the rotary axis in accordance with a set of rotary axis rotational angles;
   obtaining a first set of 2-dimensional position measurements of the tool center indicator, wherein each of the first set of 2-dimensional position measurements is obtained with respect to a distinct rotary axis rotational angle;
   selecting, from at least two available geometry types, a geometry type corresponding to at least some of the measurements of the first set of 2-dimensional position measurements;
   causing the tool center indicator coupled with the waterjet cutting machine to rotate about the tilt axis in accordance with a set of tilt axis rotational angles;
   obtaining a second set of 2-dimensional position measurements of the tool center indicator, wherein each of the second set of 2-dimensional position measurements is obtained with respect to a distinct tilt axis rotational angle;
   fitting an elliptical model to the second set of measurements to determine a first 3-dimensional offset factor with respect to the tilt axis;
   fitting a geometric model to the first set of measurements to determine a second 3-dimensional offset factor with respect to the rotary axis, wherein the geometric model is of the selected geometry type;
   calculating at least one 3-dimensional offset applicable to a tool center point (TCP) associated with the tool control mechanism based at least in part on the first and second 3-dimensional offset factors; and
   causing the waterjet cutting machine to compensate for the at least one 3-dimensional offset.

2. The non-transitory computer-readable medium of claim 1, wherein fitting the elliptical model comprises determining a centroid of a fitted ellipse.

3. The non-transitory computer-readable medium of claim 2, the method further comprising generating a third set of 2-dimensional position measurements based at least in part on the determined centroid.

4. The non-transitory computer-readable medium of claim 3, the method further comprising determining at least one component of the first 3-dimensional offset factor based at least in part on a difference between the second set of position measurements and third set of position measurements.

5. The non-transitory computer-readable medium of claim 1, wherein the first and second sets of measurements are obtained on a same measurement plane.

6. The non-transitory computer-readable medium of claim 1, wherein the rotary axis and the tilt axis form a fixed angle.

7. The non-transitory computer-readable medium of claim 6, wherein calculating the at least one 3-dimensional offset is further based on the fixed angle.

8. A method in a computing system for calibrating a tool control mechanism used by a numerically controlled (NC) machining system, the tool control mechanism including at least one rotational axis, the method comprising:
   fitting a geometric model on a set of 2-dimensional position measurements of a tool center point (TCP) rendered by the tool control mechanism, wherein individual 2-dimensional position measurements A) correspond to a respective rotational angle of a rotational axis and B) are not measured relative to a position of the NC machining system along non-rotational axes;
   deriving one or more offset factors with respect to each of one or more of the rotational axes, without regard to position of the NC machining system along non-rotational axes, wherein the deriving is based at least in part on the fitted geometric model, and wherein the one or more offset factors at least partially define a kinematic model that models 3-dimensional offsets of the TCP;
   utilizing the kinematic model as defined by the one or more offset factors to determine a 3-dimensional offset of the TCP based at least in part on a specified rotational angle of one of the at least one rotational axis; and
   causing application of positional compensation to the TCP in accordance with the determined 3-dimensional offset.

9. The method of claim 8, wherein the NC machining system includes a beam cutter system.

10. The method of claim 8, further comprising obtaining the set of 2-dimensional position measurements on a measurement plane not perpendicular to the rotational axis.

11. The method of claim 8, further comprising causing indirect measuring of the TCP to obtain the set of 2-dimensional position measurements.

12. The method of claim 11, wherein indirect measuring comprises measuring a surface of a probe coupled to the tool control mechanism.

13. The method of claim 8, wherein application of positional compensation comprises application of linear motion compensation independent of rotations about the at least one rotational axis.

14. A non-transitory computer-readable medium having contents configured to cause a computing system to perform a method in a computing system for calibrating numerically controlled (NC) machining system including at least two different rotational axes, the method comprising:
   obtaining at least two sets fitting a geometric model on a set of 2-dimensional measurements,
      wherein each set of the 2-dimensional measurements corresponds to a particular one of the at least two different rotational axes,
      wherein each set of the 2-dimensional measurements indicates positions of a tool under control of the NC machining system, and
      wherein individual 2-dimensional measurements, in each particular set of the at least two sets of 2-dimensional measurements, correspond to a respective rotational angle of the rotational axis corresponding to that particular set;
   selecting, from at least two available geometry types, one or more geometry types corresponding to each of one or more of the at least two sets of 2-dimensional measurements;
   fitting at least two geometric models, one to each of the at least two sets of 2-dimensional measurements, wherein at least one of the at least two geometric models is of the selected one or more geometry types;

deriving at least two geometric model-based offset factors based at least in part on the fitted at least two geometric models, wherein the at least two geometric model-based offset factors at least partially define a mathematical calibration model for determining compensation to a 3-dimensional position of the tool; and causing operation of the NC machining system based on the mathematical calibration model as at least partially defined by the at least two geometric model-based offset factors.

15. The non-transitory computer-readable medium of claim 14, wherein selecting one of the one or more geometry types is based at least in part on a statistical threshold.

16. The non-transitory computer-readable medium of claim 15, wherein the statistical threshold is derived from standard deviations of errors between the corresponding set of 2-dimensional measurements and corresponding values of the fitted geometry.

17. The non-transitory computer-readable medium of claim 14, wherein the at least two available geometry types include two or more of an ellipse, a circle, a parabolic shape, or a hyperbolic shape.

18. The non-transitory computer-readable medium of claim 14, wherein the mathematical calibration model accounts for a rotational sequence about the at least two different rotational axes.

19. The non-transitory computer-readable medium of claim 18, wherein the at least two different rotational axes form an angle.

20. The non-transitory computer-readable medium of claim 19, wherein the mathematical calibration model specifies a relationship between a 3-dimensional position of the tool and rotational angles of the at least two different rotational axes.

\* \* \* \* \*